(12) United States Patent
Deutsch et al.

(10) Patent No.: US 12,066,888 B2
(45) Date of Patent: Aug. 20, 2024

(54) EFFICIENT SECURITY METADATA ENCODING IN ERROR CORRECTING CODE (ECC) MEMORY WITHOUT DEDICATED ECC BITS

(71) Applicant: Intel Corporation, Santa Clara, CA (US)

(72) Inventors: Sergej Deutsch, Hillsboro, OR (US); David M. Durham, Beaverton, OR (US); Karanvir Grewal, Hillsboro, OR (US); Rajat Agarwal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 17/944,352

(22) Filed: Sep. 14, 2022

(65) Prior Publication Data

US 2024/0053904 A1 Feb. 15, 2024

Related U.S. Application Data

(60) Provisional application No. 63/397,062, filed on Aug. 11, 2022.

(51) Int. Cl.
G06F 11/10 (2006.01)
G06F 3/06 (2006.01)

(52) U.S. Cl.
CPC ........ *G06F 11/1004* (2013.01); *G06F 3/0622* (2013.01); *G06F 3/0629* (2013.01); *G06F 3/0673* (2013.01)

(58) Field of Classification Search
CPC ............. G06F 11/1004; G06F 11/1048; G06F 11/1068; G06F 11/1076; G06F 3/0622; G06F 3/0629; G06F 3/0673
See application file for complete search history.

(56) References Cited

U.S. PATENT DOCUMENTS

| | | | |
|---|---|---|---|
| 2016/0211942 A1* | 7/2016 | Kameyama | ........... H04L 1/0041 |
| 2017/0063401 A1* | 3/2017 | Jeganathan | ....... H03M 13/2909 |
| 2019/0043600 A1* | 2/2019 | Saileshwar | ............. G06F 21/79 |

\* cited by examiner

*Primary Examiner* — Shelly A Chase
(74) *Attorney, Agent, or Firm* — Nicholson De Vos Webster & Elliott LLP

(57) ABSTRACT

The technology disclosed herein comprises a processor; a memory to store data and a plurality of error correcting code (ECC) bits associated with the data; and a memory controller coupled to the memory, the memory controller to receive a write request from the processor and, when an access control field is selected in the write request, perform an exclusive OR (XOR) operation on the plurality of ECC bits and a fixed encoding pattern to generate a plurality of encoded ECC bits and store the data and the plurality of encoded ECC bits in the memory.

26 Claims, 8 Drawing Sheets

EFFICIENT SECURITY METADATA ENCODING IN ERROR CORRECTING CODE (ECC) MEMORY WITHOUT DEDICATED ECC BITS

This application claims the benefit of U.S. Provisional Patent Application No. 63/397,062, filed Aug. 11, 2022, which is incorporated by reference herein in its entirety.

FIELD

Embodiments relate generally to accessing memory in a computing system, and more particularly, to improving performance of reading and writing security metadata in ECC memory in computing systems.

BACKGROUND

Error-correcting code (ECC) dynamic random-access memory (DRAM) modules provide additional storage for in-line ECC. For instance, a typical high reliability, availability, serviceability (RAS) 10×4 double data rate five (DDR5) dual inline memory module (DIMM) incorporates two ECC devices, allowing for storing of an additional 128 bits per cacheline (512b). These bits are read simultaneously with the data, hence there is no impact on bandwidth or latency. Certain security technologies use a portion of that storage for in-line security metadata, effectively "stealing" bits from the error correcting code. For example, an implementation of a trusted execution environment (TEE) such as Trust Domain Executions (TDX) by Intel Corporation stores one bit per cacheline in ECC memory to indicate whether this memory is within the trusted domain. One consequence of "stealing" bits from ECC is reduced error coverage. For instance, a 10×4 DIMM with one stolen bit from 128 bits of ECC cannot guarantee single-device data correction (SDDC) anymore with 127 bits of ECC, despite SDDC being an important feature for server memory.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

Figure 1:
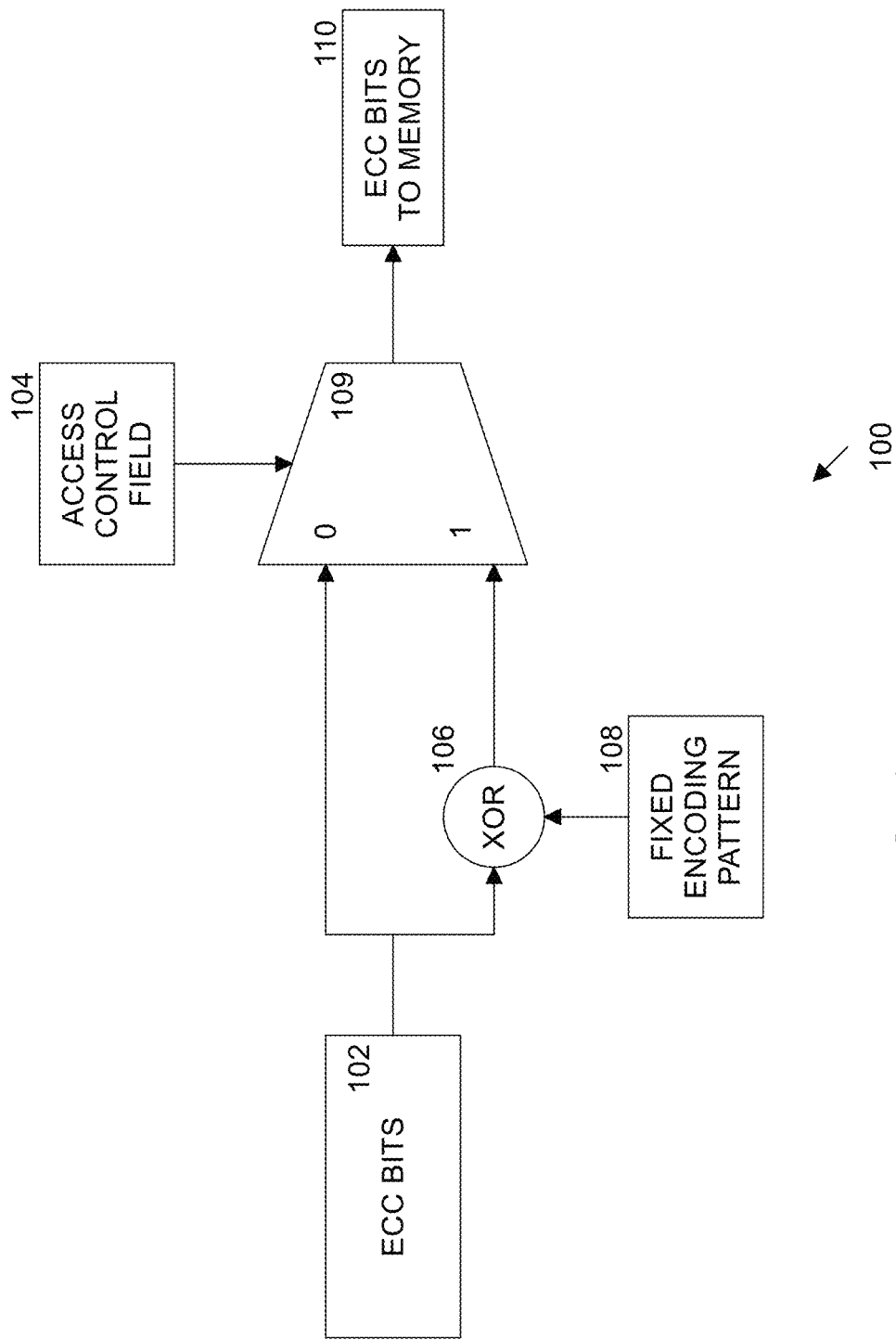
FIG. 1 is a diagram of an access control field indicating application of a fixed encoding pattern to ECC bits according to an implementation.

Implementations of the disclosure provide efficient security metadata encoding in ECC memory that reduces or eliminates negative impacts to reliability, availability and serviceability (RAS) when used with encoded security metadata of a certain type. An implementation provides 100% SDDC while also determining if the accessed memory is protected for use by a trusted execution environment (TEE), effectively removing the trusted domain (TD) bit dependency, in one example.

Some prior approaches adjusted error correcting code to fit into the reduced space and reduced error coverage, stored non-ECC metadata in sequestered memory, and/or added additional ECC memory devices to store metadata (which is very expensive). The prior approaches suffered from negative impacts to RAS and/or performance (including storing and fetching security metadata from sequestered memory), reduced error coverage, and lost RAS features such as SDDC.

The technology described herein is a solution that instead of using dedicated bits for security metadata (such as a trusted execution environment (TEE) bit, a trusted domain (TD) bit, key identifiers (IDs), memory tags, etc.), combines a specific and selected fixed encoding bit pattern (e.g., using an exclusive-OR (XOR) operation) with the ECC bits based at least in part on the security metadata value to be encoded. On a read request, the fixed encoding pattern is removed (e.g., by application of an XOR operation) based at least in part on the read request's security metadata. If there is a mismatch between the security metadata associated with the read request and the originally encoded security metadata (during a write request), ECC circuitry will detect this condition as an error.

In an implementation, the security metadata is called an access control field herein. The access control field may comprise one or more bits to indicate a security status. The access control field may also be used to select one of a plurality of fixed encoding patterns in one implementation.

The technology described herein is applicable to the types of security metadata bits that are stored in DRAM on cacheline write requests and that are validated on each read request. For example, TDX stores one bit per cacheline, called a TD bit, that is set if the cacheline is within the trusted domain memory. On read requests, the processing core provides a request TD bit, which is set if and only if the request originates from a TD. The request TD bit is then compared with the security metadata bit retrieved from memory. If the bits don't match, that means non-TD software is trying to read TD memory or vice versa. An aspect of this security processing is that the security metadata bit is available on read requests and only needs to be validated.

Other, similar types of security metadata handled in this manner may include cryptographic key IDs, or memory tags in general, that are stored in memory on write requests and are validated on read requests.

An implementation combines ECC bits and the security metadata encoded via fixed encoding patterns, instead of stealing bits from the ECC as in a prior approach.

FIG. 1 is a diagram 100 of an access control field 104 indicating application of a fixed encoding pattern 108 to ECC bits 102 (associated with data to be stored in a memory) according to an implementation. During a write operation, when ECC bits 102 are to be stored to a memory, if access control field 104 does not indicate encoding the ECC bits to a multiplexor 109 (e.g., access control field is not set, or 0), then ECC bits 102 are stored in the memory without modification (as ECC bits to memory 110). If access control field 104 does indicate encoding the ECC bits (e.g., when access control field 104 (such as a TEE bit or TD bit, for example) is set or otherwise indicates encoding, or 1), then XOR 106 combines ECC bits 102 with fixed encoding pattern 108 to generate ECC bits to memory 110. The ECC bits to memory 110 is stored in the memory. Fixed encoding pattern 108 comprises a plurality of bits. In an implementation, a number of bits in ECC bits 102 is the same as a number of bits in fixed encoding pattern 108.

Figure 2:
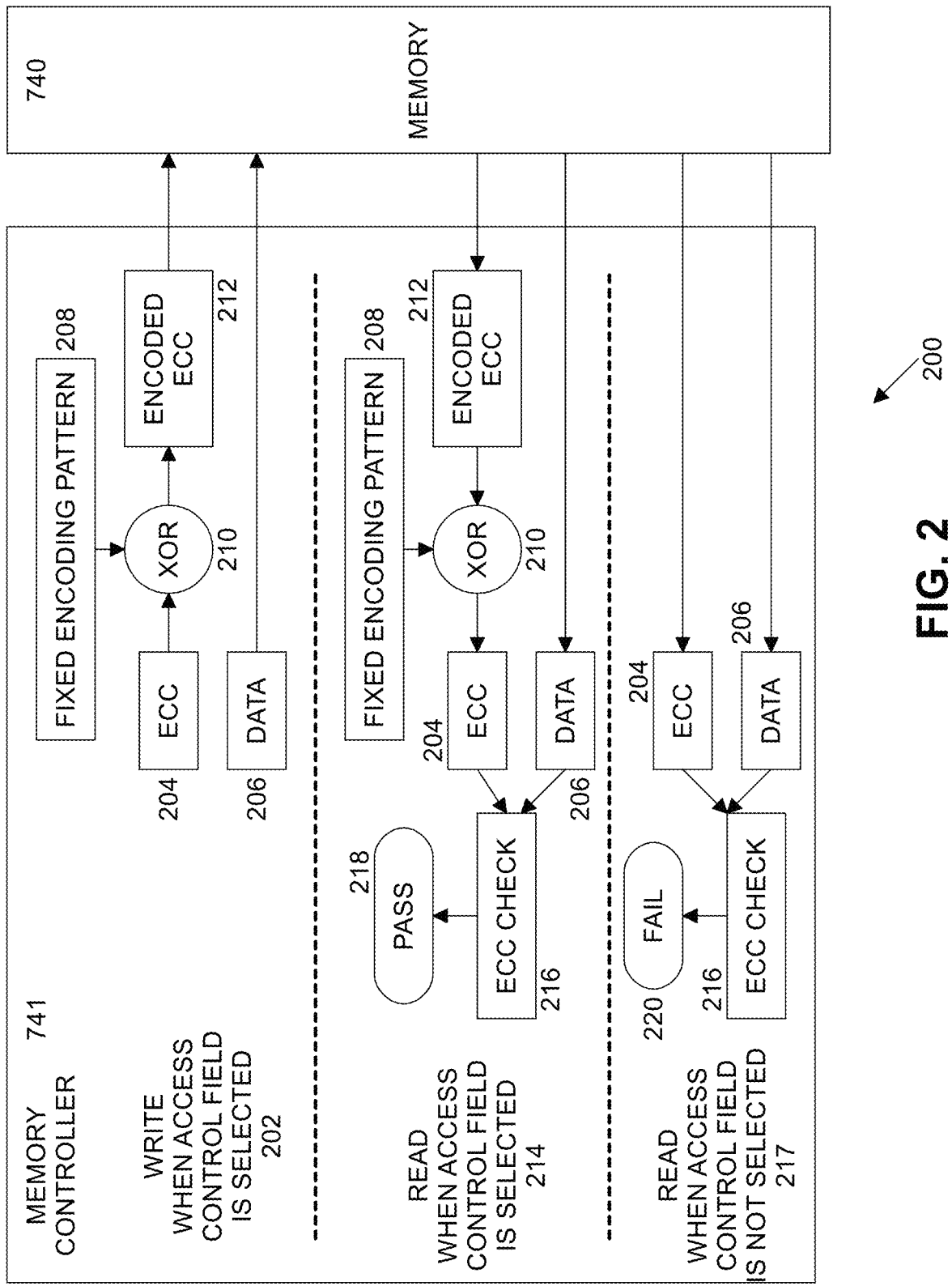
FIG. 2 is a diagram of memory controller processing in an implementation.

FIG. 2 is a diagram of memory controller 741 processing 200 in an implementation. When access control field 104 is selected (e.g., set) during a write operation 202, ECC 204 is XORed 210 with fixed encoding pattern 208 to generate encoded ECC 212. Encoded ECC 212 is stored along with data 206 in memory 740. Subsequently, when a read request is received to get the data out of memory 740, when access control field 104 is selected during a read operation 214, encoded ECC 212 and data 206 are read from memory 740. Encoded ECC 212 is XORed 210 with fixed encoding pattern 208 to regenerate ECC 204 (effectively removing the fixed encoding pattern from the encoded ECC). ECC check 216 is performed on ECC 204 and data 206. Since the access control field was selected on the prior write operation and is selected on the current read operation (e.g., the write requester and the read requester have the same value for the access control field), the ECC check passes at block 218. When a read request is received to get the data out of memory 740, when access control field 104 is not selected during a read operation 217, ECC 204 and data 206 are read from memory 740, without performing an XOR on the ECC 204. ECC check 216 is performed on ECC 204 and data 206. Since the access control field was selected on the prior write operation and is not on the current read operation (e.g., the write requester and the read requester do not have the same value for the access control field), the ECC check fails at block 220.

If the wrong access control field 104 (e.g., TEE bit) was provided on the read request (e.g., TEE=0), then the fixed encoding pattern is not removed from the ECC and an existing error-correcting process detects this condition as an uncorrectable error with a specific syndrome. This is guaranteed, since ECC is linear, so a fixed encoding pattern 208 will always result in the same syndrome on an access control field (e.g., TEE bit) mismatch, unless there is also an error in memory 740. Thus, access to a TD memory from non-TD software, for example, is detected and reported.

The flow for writes with access control field 104 not selected works in a similar fashion. No fixed encoding pattern is applied on processing of a write request. If the memory is read with the access control field selected, the fixed encoding pattern is mixed into the ECC bits, resulting in an uncorrectable error with a pre-determined syndrome.

Figure 3:
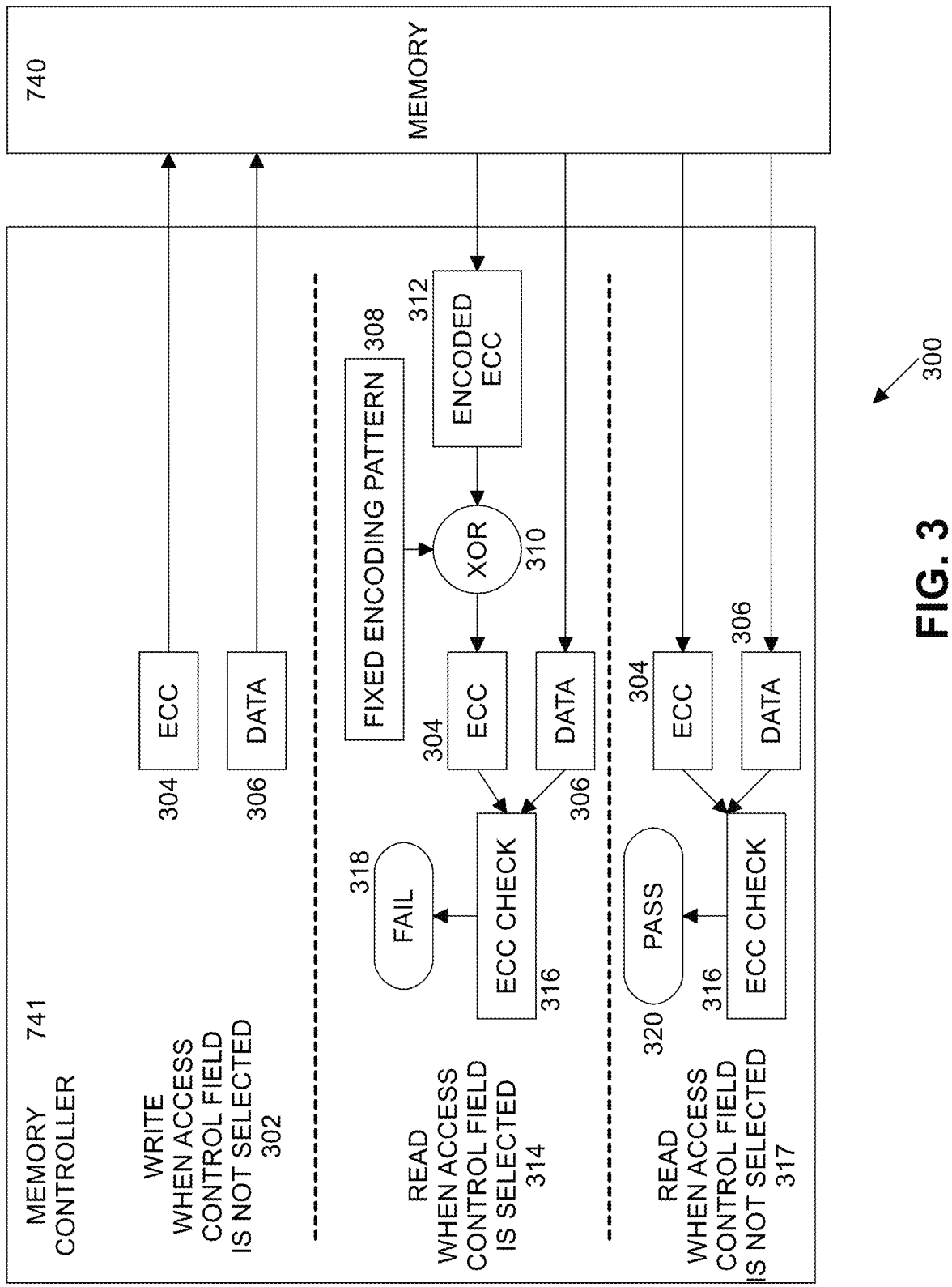
FIG. 3 is a diagram of memory controller processing in an implementation.

FIG. 3 is a diagram of memory controller 741 processing 300 in an implementation. When access control field 104 is not selected (e.g., not set) during a write operation 302, ECC 304 is stored along with data 306 in memory 704. Subsequently, when a read request is received to get the data out of memory 740, when access control field 104 is selected during a read operation 314, encoded ECC 312 and data 306 are read from memory 740. Encoded ECC 312 is XORed 310 with fixed encoding pattern 308 to regenerate ECC 304 (effectively removing the fixed encoding pattern from the encoded ECC). ECC check 316 is performed on ECC 304 and data 306. Since the access control field was not selected on the prior write operation but is on the current read operation (e.g., the write requester and the read requester do not have the same value for the access control field), the ECC check fails at block 318. When a read request is received to get the data out of memory 740, when access control field 104 is not selected during a read operation 317, ECC 304 and data 306 are read from memory 740, without performing an XOR on the ECC 304. ECC check 316 is performed on ECC 304 and data 306. Since the access control field was not selected on the prior write operation and is not on the current read operation (e.g., the write requester and the read requester have the same value for the access control field), the ECC check passes at block 320.

Error correction is performed independently of the selected fixed encoding pattern. If the access control field matches on a read request, the access control field is automatically removed from the ECC bits, so even if there are errors in data or ECC bits, normal error correction flows will be performed.

In case of an access control field mismatch and an error in memory 740, both the fixed encoding pattern and the error are superimposed on top of the data/ECC bits. If there is no error in the memory and the security metadata (access control field) mismatches, the ECC algorithm will deterministically detect the mismatch as an uncorrectable error with a specific syndrome. If both events happen (access control bit mismatch and error in memory), then this will be likely detected as uncorrectable error, with a small probability of mis-correction.

Figure 4:
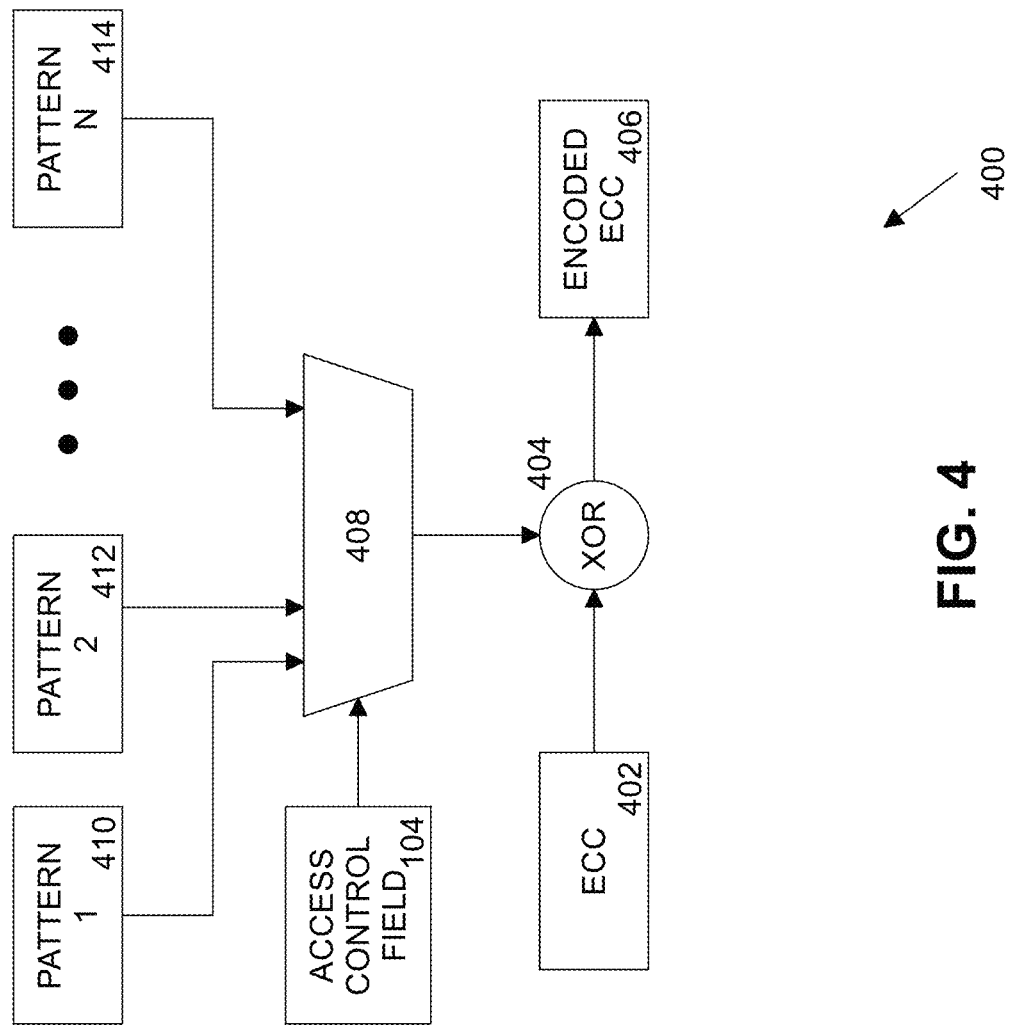
FIG. 4 is a logic diagram of selecting a fixed encoding pattern in an implementation.

The access control field may comprise one bit of metadata (e.g., a TEE bit) or multiple bits of security metadata. In general, multiple bits of security metadata may be encoded via distinct fixed encoding patterns that may be selected via a multiplexer. FIG. 4 is a logic diagram 400 of selecting a fixed encoding pattern in an implementation. ECC 402 may be XORed 404 with a fixed encoded pattern according to the access control field 104 to generate encoded ECC 406, as described above. However, when access control field 104 comprises multiple values (e.g., multiple bits), in an implementation, access control field 104 may be used to select via multiplexor 408 one of a plurality of fixed encoding patterns, such as pattern 1 410, pattern 2 412, . . . pattern N 414, where N is a natural number, to be XORed 404 with ECC 402.

Each access control field value "m_i" corresponds to a Pattern_i and the multiplexor 408 selects the corresponding fixed encoding pattern based on the access control field value on write requests, as well on read requests. If the data is read with a access control field value m_i that differs from that provided on the write request, the fixed encoding pattern will not be removed from the ECC bits. Instead, the new ECC bits 402 will be equal to the original ECC bits XOR (Pattern_i XOR Pattern_j). The bit patterns need to be chosen such that any combination of mismatched bit patterns "Pattern_i XOR Pattern_j" results in an uncorrectable error, such that any mismatch of access control field bits is detected. By using this method, all ECC bits are preserved and hence there is no impact on the correction capability of the computing system.

When using Reed Solomon codes for error correction, the fixed encoding pattern may alternatively be encoded as a fixed data symbol that is not explicitly stored in memory. This data symbol is determined by the access control field (e.g., TEE bit) input provided by a processor (with the memory access request). If the wrong access control field (e.g., TEE bit) input is provided, the fixed symbol will be wrong and would be corrected by the Reed Solomon code to the correct symbol, showing the error was the incorrect input as provided by the processor (for example, identifying an illegal attempt to access the TEE's protected memory). If an additional memory error is present, the fixed symbol may not be recoverable, but the combination of errors will still result in a detected uncorrectable error with high probability. In this case, the correction logic may additionally test for this condition by setting the TEE fixed data symbol to the alternate value, and then attempting correction of the remaining corrupted data symbols. If correction was possible, then it can be determined that the TEE bit provided by the processor didn't match the expected value for the stored data line, and that the remaining data errors were successfully corrected.

Figure 5:
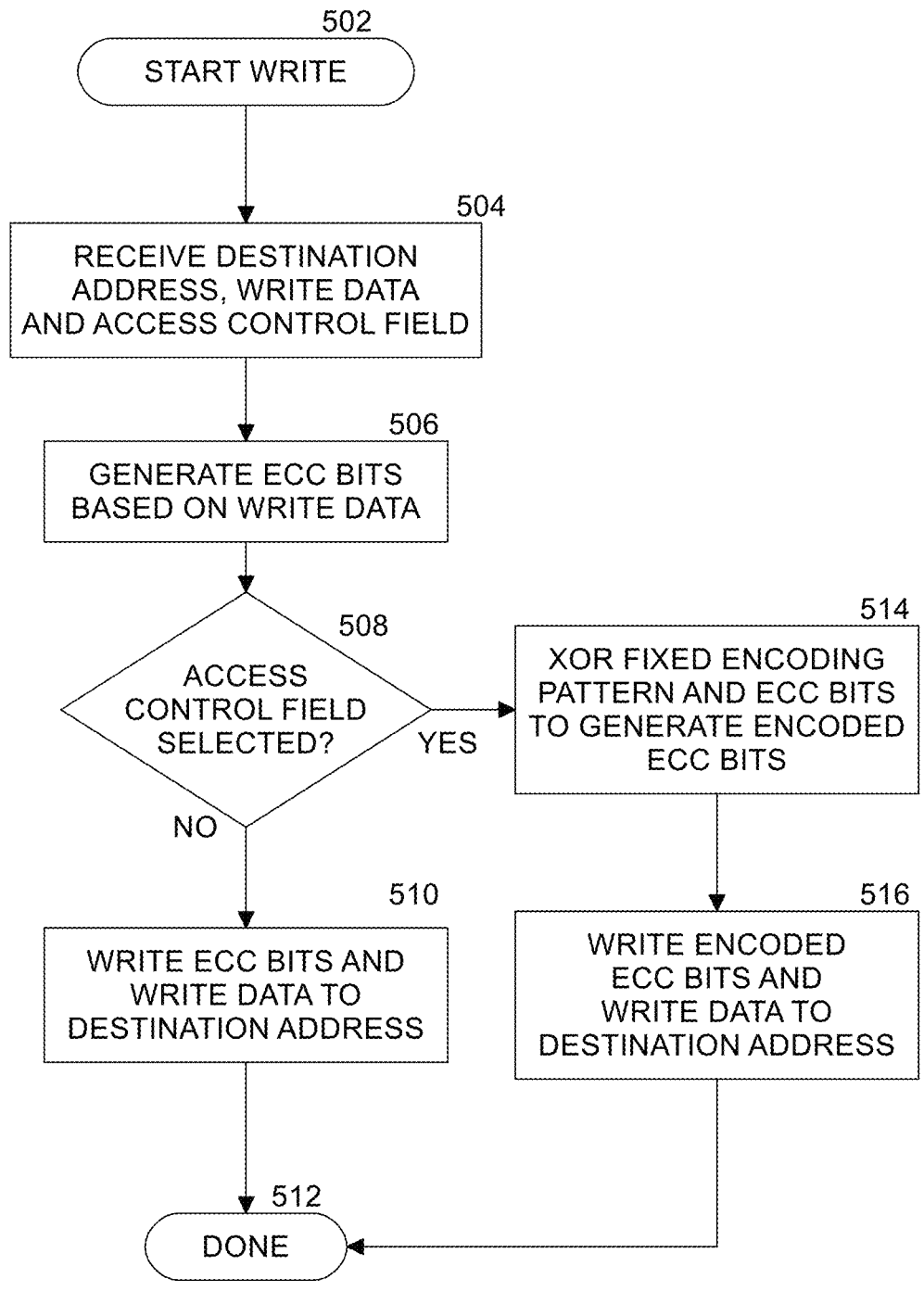
FIG. 5 is a flow diagram of memory controller processing for writing data to a memory according to an implementation.

FIG. 5 is a flow diagram of memory controller 741 processing 500 for writing data to a memory 740 according to an implementation. At block 502, write request processing is begun. At block 504, memory controller 741 receives a destination address (e.g., an address in memory 740 to write data), write data, and access control field 104. In an implementation, memory controller 741 receives a write request from a processor 710. At block 506, memory controller 741 generates ECC bits based on the write data. At block 508, if the access control field is selected (e.g., is non-zero (set)), then at block 514 memory controller 741 XOR's a fixed encoding pattern with the ECC bits to generate encoded ECC bits. In an implementation, a specific fixed encoding pattern may be selected from among a plurality of fixed encoding patterns according to the value of the access control field. At block 516, memory controller 741 writes the encoded ECC bits and the write data to the memory starting at the destination address. Write processing is then done at block 512. If at block 508 the access control field is not selected (e.g., is zero (not set)), then at block 510 memory controller 741 writes the ECC bits (unmodified by the fixed encoding pattern) and the write data to the memory starting at the destination address, and write processing is done at block 512.

Figure 6A:
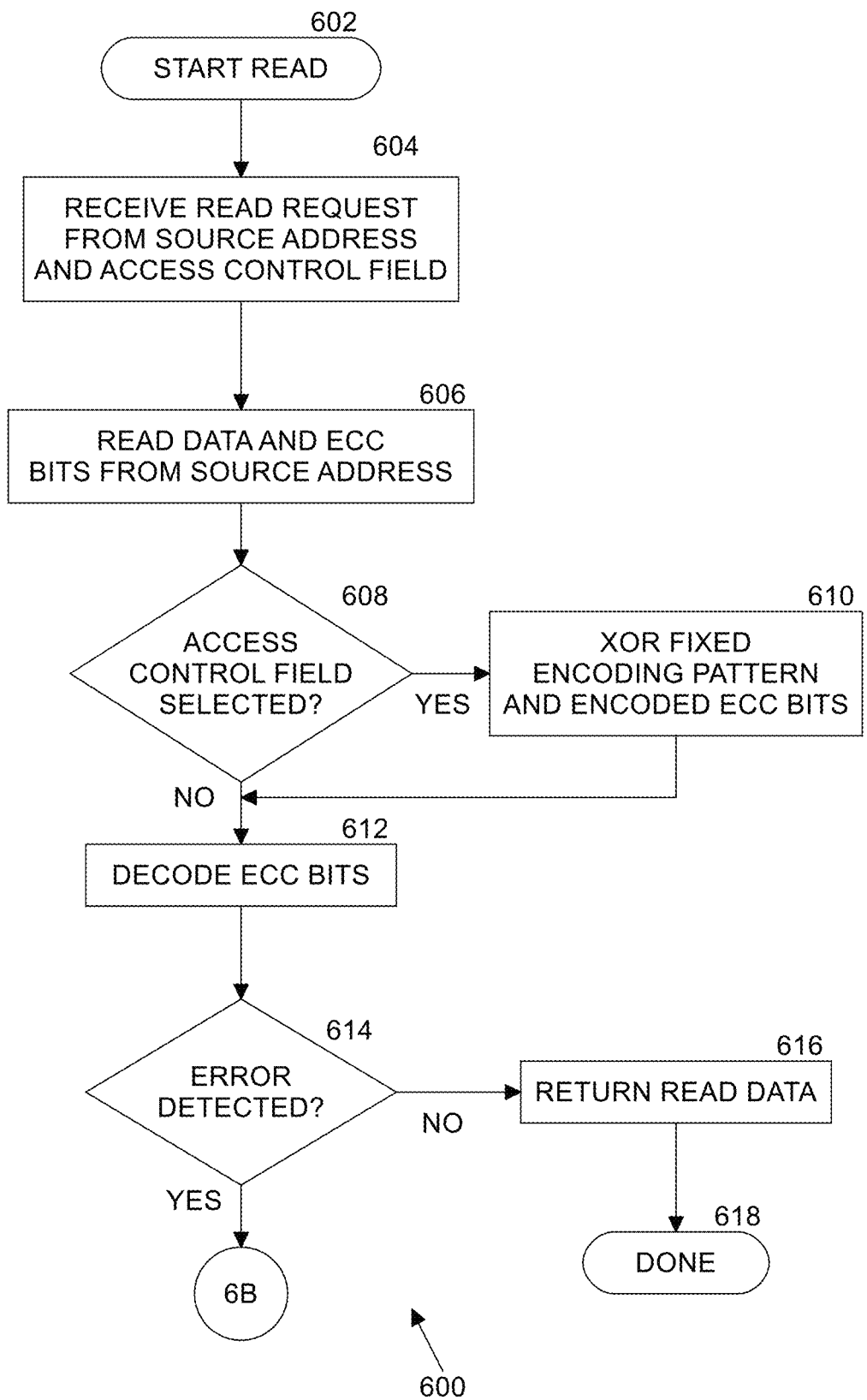
FIGS. 6A and 6B are flow diagrams of memory controller processing for reading data from a memory according to an implementation.
Figure 6B:
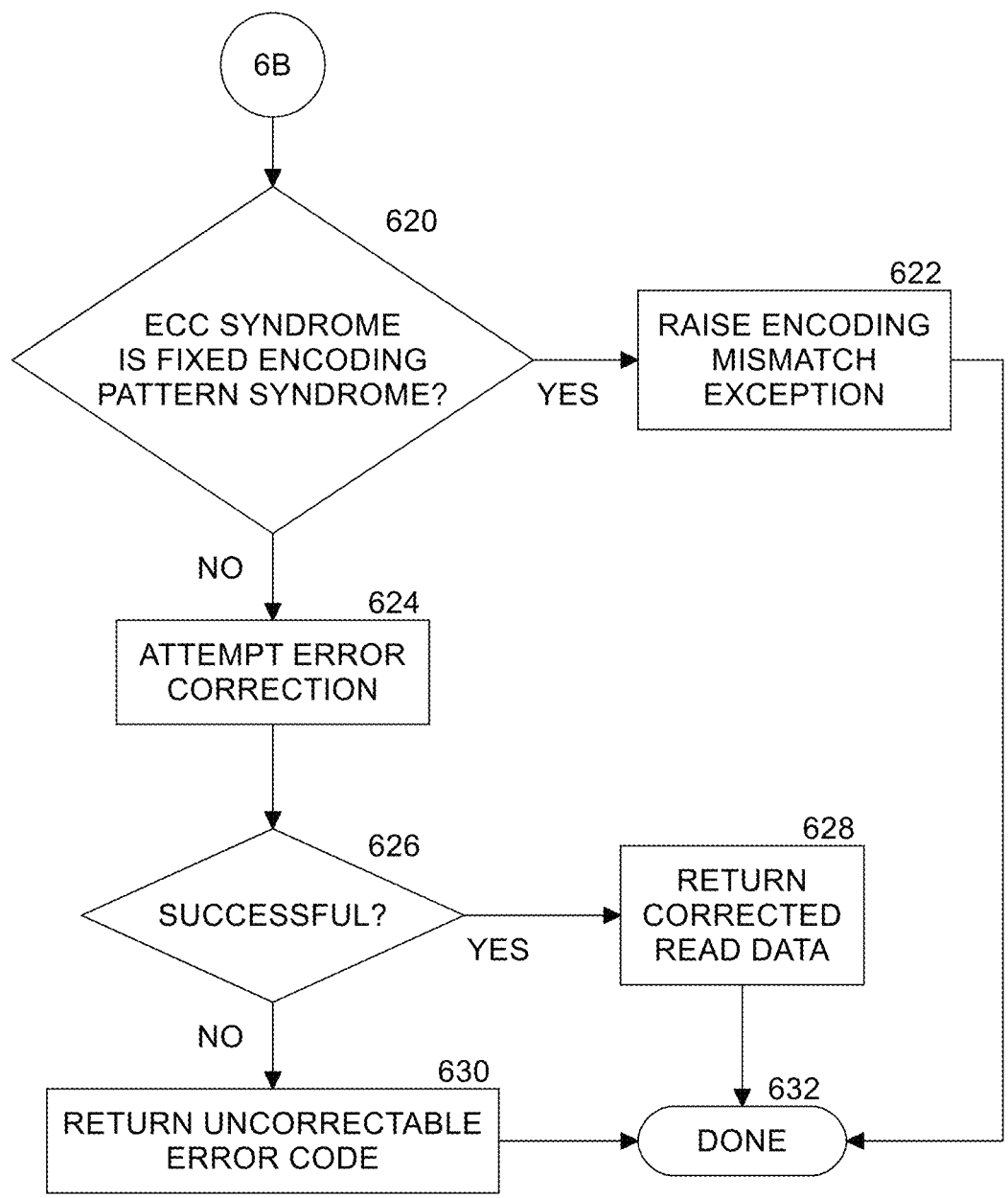

FIGS. 6A and 6B are flow diagrams of memory controller 741 processing 600 for reading data from a memory 740 according to an implementation. At block 602, read processing is begun. At block 604, memory controller 741 receives a read request including a source address (e.g., an address in memory 740 to read data) and access control field 104. In an implementation, memory controller 741 receives a read request from processor 710. At block 606, memory controller 741 reads data and ECC bits from memory 740 starting at the source address. At block 608, if the access control field is selected (e.g., is non-zero (set)), then at block 610 memory controller 741 XORs a fixed encoding pattern and the (previously encoded) ECC bits read from memory 740. Processing continues at block 612. If the access control field is not selected (e.g., is zero (not set)) at block 608, then processing continues directly to block 612. At block 612, memory controller 741 decodes the ECC bits. At block 614, if an error is not detected when decoding the ECC bits, then memory controller 741 returns the read data to the requester (e.g., the processor) at block 616, and read processing is done at block 618.

At block 614, if an error is detected when decoding the ECC bits, read processing continues at block 620 on FIG. 6B via connector 6B. At block 660, if the ECC syndrome is the same as the fixed encoding pattern syndrome, then at block 622 memory controller 741 raises an encoding mismatch exception and read processing is done at block 632. If at block 620, the ECC syndrome is not the same as the fixed encoding pattern syndrome, then at block 624 memory controller 741 attempts to correct the error detected when decoding the ECC bits. At block 626, if correction of the error is successful, memory controller 741 returns the corrected read data to the requester and read processing is done at block 632. Otherwise, memory controller 741 returns an uncorrectable error code to the requester at block 630 and read processing is done at block 632.

Figure 7:
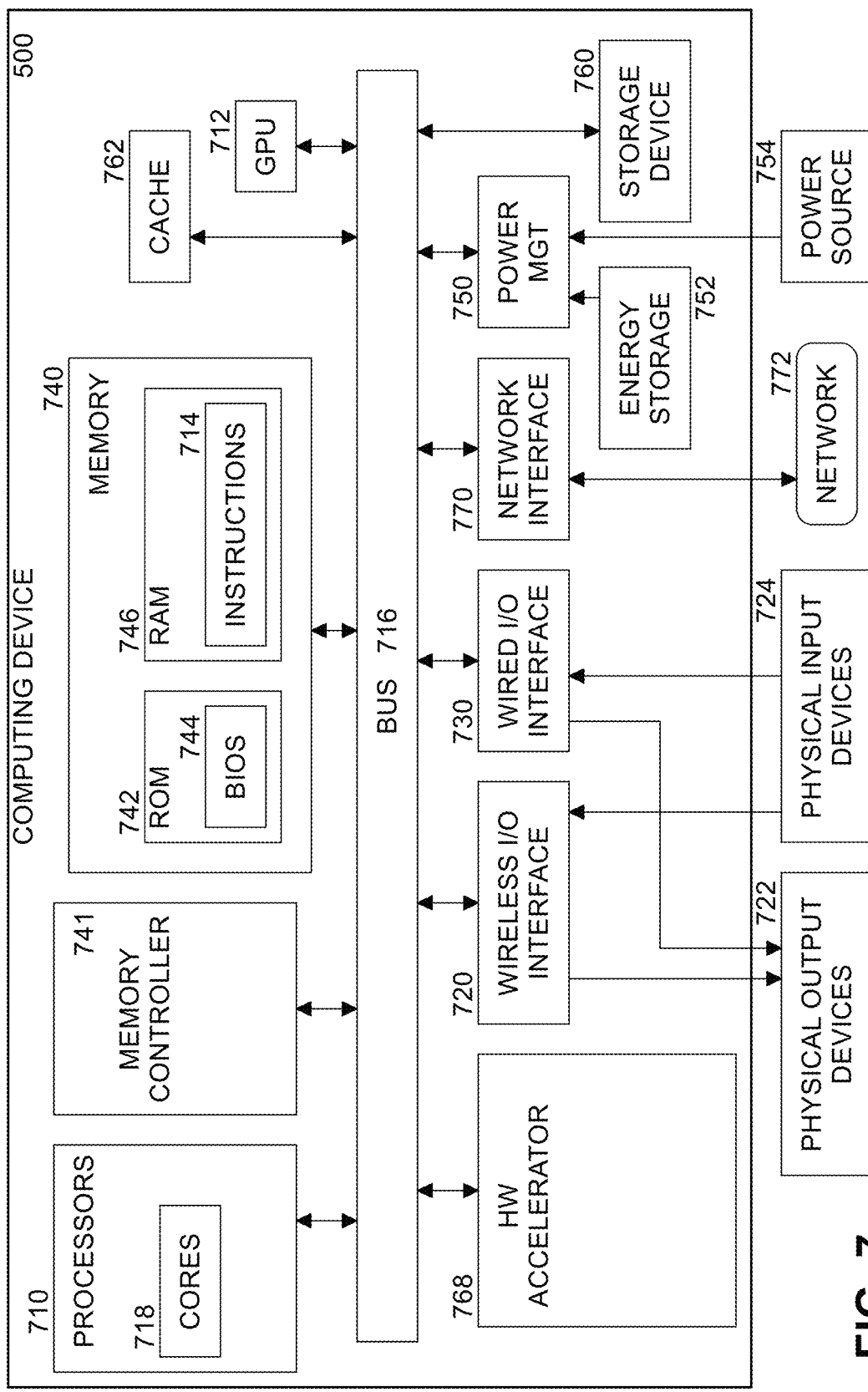
FIG. 7 is a schematic diagram of an illustrative electronic computing device to perform a method of memory controller processing according to an implementation.

FIG. 7 is a schematic diagram of an illustrative electronic computing device to perform a method of memory controller processing according to an implementation. In some embodiments, the computing device 700 includes one or more processors 710 including one or more processors cores 718 and memory controller 741 to perform ECC encode/decode processing, as described in FIGS. 1-6. In some embodiments, the computing device 700 includes one or more hardware accelerators 768.

In some embodiments, the computing device is to implement ECC encode/decode processing, as described in FIGS. 1-6.

The computing device 700 may additionally include one or more of the following: cache 762, a graphical processing unit (GPU) 712 (which may be the hardware accelerator in some implementations), a wireless input/output (I/O) interface 720, a wired I/O interface 730, memory circuitry 740, power management circuitry 750, non-transitory storage device 760, and a network interface 770 for connection to a network 772. The following discussion provides a brief, general description of the components forming the illustrative computing device 700. Example, non-limiting computing devices 700 may include a desktop computing device, blade server device, workstation, or similar device or system.

In embodiments, the processor cores 718 are capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 714 may include instructions to implement security ECC encoding/decoding processing, as provided in FIGS. 1-6.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 700 includes a bus or similar communications link 716 that communicably couples and facilitates the exchange of information and/or data between various system components including the processor cores 718, the cache 762, the graphics processor circuitry 712, one or more wireless I/O interfaces 720, one or more wired I/O interfaces 730, one or more storage devices 760, and/or one or more network interfaces 770. The computing device 700 may be referred to in the singular herein, but this is not intended to limit the embodiments to a single computing device 700, since in certain embodiments, there may be more than one computing device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art. The bus 716 that interconnects at least some of the components of the computing device 700 may employ any currently available or future developed serial or parallel bus structures or architectures.

The system memory 740 may include read-only memory ("ROM") 742 and random-access memory ("RAM") 746. Memory 740 may be managed by memory controller 741. Data and ECC bits may be written to and read from memory 740 by processor 710 using memory controller 741. A portion of the ROM 742 may be used to store or otherwise retain a basic input/output system ("BIOS") 744. The BIOS 744 provides basic functionality to the computing device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, a neural network, a machine learning model, or similar devices.

The computing device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include but are not limited to: universal serial bus (USB), IEEE 1394 ("FireWire"), and similar.

The computing device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the computing device 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The computing device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the computing device 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

Flowcharts representative of example hardware logic, machine readable instructions, hardware implemented state machines, and/or any combination thereof for implementing computing device 700, for example, are shown in FIGS. 1-6. The machine-readable instructions may be one or more executable programs or portion(s) of an executable program for execution by a computer processor such as the processor 710 shown in the example computing device 700 discussed above in connection with FIG. 7. The program may be embodied in software stored on a non-transitory computer readable storage medium such as a CD-ROM, a floppy disk, a hard drive, a DVD, a Blu-ray disk, or a memory associated with the processor 710, but the entire program and/or parts thereof could alternatively be executed by a device other than the processor 710 and/or embodied in firmware or dedicated hardware. Further, although the example program is described with reference to the flowchart illustrated in FIGS. 1-6, many other methods of implementing the example systems 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine readable instructions and/or program(s) regardless of the particular format or state of the machine readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example process of FIGS. 1-6 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

EXAMPLES

Example 1 is an apparatus including a processor; a memory to store data and a plurality of error correcting code (ECC) bits associated with the data; and a memory controller coupled to the memory, the memory controller to receive a write request from the processor and, when an access control field is selected in the write request, perform an exclusive OR (XOR) operation on the plurality of ECC bits and a fixed encoding pattern to generate a plurality of encoded ECC bits and store the data and the plurality of encoded ECC bits in the memory.

In Example 2, the subject matter of Example 1 may optionally include the memory controller to receive a read request from the processor, read the data and the plurality of encoded ECC bits from the memory and, when an access control field is selected in the read request, perform an XOR operation on the plurality of encoded ECC bits and the fixed encoding pattern to generate the plurality of ECC bits. In Example 3, the subject matter of Example 2 may optionally include the memory controller to decode the plurality of ECC bits and return the data to the processor when no error is detected in the decoded plurality of ECC bits. In Example 4, the subject matter of Example 3 may optionally include the memory controller to, when an error is detected in the decoded plurality of ECC bits, raise an exception when an ECC syndrome matches a fixed encoding pattern syndrome. In Example 5, the subject matter of Example 3 may optionally include the memory controller to, when an error is detected in the decoded plurality of ECC bits, attempt an error correction when an ECC syndrome does not match a fixed encoding pattern syndrome. In Example 6, the subject matter of Example 5 may optionally include the memory controller to return corrected data to the processor when the attempt at error correction is successful. In Example 7, the subject matter of Example 5 may optionally include the memory controller to return an uncorrectable error code to the processor when the attempt at error correction is not successful. In Example 8, the subject matter of Example 1 may optionally include wherein the access control field comprises security metadata. In Example 9, the subject matter of Example 8 may optionally include the processor to request the memory controller to store the security metadata in the memory on write requests and to validate the security metadata on read requests. In Example 10, the subject matter of Example 8 may optionally include wherein the security metadata comprises one of a trusted execution environment (TEE) bit and a trusted domain (TD) bit. In Example 11, the subject matter of Example 1 may optionally include the memory controller to receive the write request from the processor and, when the access control field is not selected in the write request, store the data and the plurality of ECC bits in the memory, and to receive a read request from the processor, and when the access control field is selected in the read request, decode the plurality of ECC bits and detect an error. In Example 12, the subject matter of Example 1 may optionally include wherein the access control field is to select one of a plurality of fixed encoding patterns.

Example 13 is a method including receiving, by a memory controller, a write request from a processor, the write request including data to be stored in a memory and an access control field; and when an access control field is selected in the write request, performing an exclusive OR (XOR) operation on a plurality of ECC bits associated with the data and a fixed encoding pattern to generate a plurality of encoded ECC bits and storing the data and the plurality of encoded ECC bits in the memory.

In Example 14, the subject matter of Example 13 may optionally include receiving, by the memory controller, a read request from the processor, reading the data and the plurality of encoded ECC bits from the memory and, when an access control field is selected in the read request, performing an XOR operation on the plurality of encoded ECC bits and the fixed encoding pattern to generate the plurality of ECC bits. In Example 15, the subject matter of Example 14 may optionally include decoding the plurality of ECC bits and returning the data to the processor when no error is detected in the decoded plurality of ECC bits. In Example 16, the subject matter of Example 15 may optionally include when an error is detected in the decoded plurality of ECC bits, raising an exception when an ECC syndrome matches a fixed encoding pattern syndrome. In Example 17, the subject matter of Example 15 may optionally include when an error is detected in the decoded plurality of ECC bits, attempting an error correction when an ECC syndrome does not match a fixed encoding pattern syndrome. In Example 18, the subject matter of Example 17 may optionally include returning corrected data to the processor when the attempt at error correction is successful. In Example 19, the subject matter of Example 17 may optionally include returning an uncorrectable error code to the processor when the attempt at error correction is not successful. In Example 20, the subject matter of Example 13 may optionally include wherein the access control field comprises security metadata. In Example 21, the subject matter of Example 13 may optionally include receiving the write request from the processor and, when the access control field is not selected in the write request, storing the data and the plurality of ECC bits in the memory, and receiving a read request from the processor, and when the access control field is selected in the read request, decoding the plurality of ECC bits and detecting an error.

Example 22 is at least one machine-readable storage medium comprising instructions which, when executed by at least one processing device, cause the at least one processing device to receive a write request from a processor, the write request including data to be stored in a memory and an access control field; and when an access control field is selected in the write request, perform an exclusive OR (XOR) operation on a plurality of ECC bits associated with the data and a fixed encoding pattern to generate a plurality of encoded ECC bits and store the data and the plurality of encoded ECC bits in the memory. In Example 23, the subject matter of Example 22 may optionally include instructions which, when executed by the at least one processing device, cause the at least one processing device to receive a read request from a processor, read the data and the plurality of encoded ECC bits from the memory and, when an access control field is selected in the read request, perform an XOR operation on the plurality of encoded ECC bits and the fixed encoding pattern to generate the plurality of ECC bits. In Example 24, the subject matter of Example 23 may optionally include instructions which, when executed by the at least one processing device, cause the at least one processing device to decode the plurality of ECC bits and return the data to the processor when no error is detected in the decoded plurality of ECC bits. In Example 25, the subject matter of Example 24 may optionally include instructions which, when executed by the at least one processing device, cause the at least one processing device to: when an error is detected in the decoded plurality of ECC bits, raise an exception when an ECC syndrome matches a fixed encoding pattern syndrome. In Example 26, the subject matter of Example 24 may optionally include instructions which, when executed by the at least one processing device, cause the at least one processing device to: when an error is detected in the decoded plurality of ECC bits, attempt an error correction when an ECC syndrome does not match a fixed encoding pattern syndrome.

Example 27 is an apparatus operative to perform the method of any one of Examples 13 to 21. Example 28 is an apparatus that includes means for performing the method of any one of Examples 13 to 21. Example 29 is an apparatus that includes any combination of modules and/or units and/or logic and/or circuitry and/or means operative to perform the method of any one of Examples 13 to 21. Example 30 is an optionally non-transitory and/or tangible machine-readable medium, which optionally stores or otherwise provides instructions that if and/or when executed by a computer system or other machine are operative to cause the machine to perform the method of any one of Examples 13 to 21.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:
    a processor;
    a memory to store data and a plurality of error correcting code (ECC) bits associated with the data; and
    a memory controller coupled to the memory, the memory controller to receive a write request from the processor and, when an access control field is selected in the write request, perform an exclusive OR (XOR) operation on the plurality of ECC bits and a fixed encoding pattern to generate a plurality of encoded ECC bits and store the data and the plurality of encoded ECC bits in the memory.

2. The apparatus of claim 1, the memory controller to receive a read request from the processor, read the data and the plurality of encoded ECC bits from the memory and, when an access control field is selected in the read request, perform an XOR operation on the plurality of encoded ECC bits and the fixed encoding pattern to generate the plurality of ECC bits.

3. The apparatus of claim 2, the memory controller to decode the plurality of ECC bits and return the data to the processor when no error is detected in the decoded plurality of ECC bits.

4. The apparatus of claim 3, the memory controller to, when an error is detected in the decoded plurality of ECC bits, raise an exception when an ECC syndrome matches a fixed encoding pattern syndrome.

5. The apparatus of claim 3, the memory controller to, when an error is detected in the decoded plurality of ECC bits, attempt an error correction when an ECC syndrome does not match a fixed encoding pattern syndrome.

6. The apparatus of claim 5, the memory controller to return corrected data to the processor when the attempt at error correction is successful.

7. The apparatus of claim 5, the memory controller to return an uncorrectable error code to the processor when the attempt at error correction is not successful.

8. The apparatus of claim 1, wherein the access control field comprises security metadata.

9. The apparatus of claim 8, comprising the processor to request the memory controller to store the security metadata in the memory on write requests and to validate the security metadata on read requests.

10. The apparatus of claim 8, wherein the security metadata comprises one of a trusted execution environment (TEE) bit and a trusted domain (TD) bit.

11. The apparatus of claim 1, the memory controller to receive the write request from the processor and, when the access control field is not selected in the write request, store the data and the plurality of ECC bits in the memory, and to receive a read request from the processor, and when the access control field is selected in the read request, decode the plurality of ECC bits and detect an error.

12. The apparatus of claim 1, wherein the access control field is to select one of a plurality of fixed encoding patterns.

13. A method comprising:
    receiving, by a memory controller, a write request from a processor, the write request including data to be stored in a memory and an access control field; and
    when an access control field is selected in the write request, performing an exclusive OR (XOR) operation on a plurality of ECC bits associated with the data and a fixed encoding pattern to generate a plurality of encoded ECC bits and storing the data and the plurality of encoded ECC bits in the memory.

14. The method of claim 13, comprising, receiving, by the memory controller, a read request from the processor, reading the data and the plurality of encoded ECC bits from the memory and, when an access control field is selected in the read request, performing an XOR operation on the plurality of encoded ECC bits and the fixed encoding pattern to generate the plurality of ECC bits.

15. The method of claim 14, comprising decoding the plurality of ECC bits and returning the data to the processor when no error is detected in the decoded plurality of ECC bits.

16. The method of claim 15, comprising, when an error is detected in the decoded plurality of ECC bits, raising an exception when an ECC syndrome matches a fixed encoding pattern syndrome.

17. The method of claim 15, comprising, when an error is detected in the decoded plurality of ECC bits, attempting an error correction when an ECC syndrome does not match a fixed encoding pattern syndrome.

18. The method of claim 17, comprising returning corrected data to the processor when the attempt at error correction is successful.

19. The method of claim 17, comprising returning an uncorrectable error code to the processor when the attempt at error correction is not successful.

20. The method of claim 13, wherein the access control field comprises security metadata.

21. The method of claim 13, comprising receiving the write request from the processor and, when the access control field is not selected in the write request, storing the data and the plurality of ECC bits in the memory, and receiving a read request from the processor, and when the access control field is selected in the read request, decoding the plurality of ECC bits and detecting an error.

22. At least one machine-readable storage medium comprising instructions which, when executed by at least one processing device, cause the at least one processing device to:
receive a write request from a processor, the write request including data to be stored in a memory and an access control field; and
when an access control field is selected in the write request, perform an exclusive OR (XOR) operation on a plurality of ECC bits associated with the data and a fixed encoding pattern to generate a plurality of encoded ECC bits and store the data and the plurality of encoded ECC bits in the memory.

23. The at least one machine-readable storage medium of claim 22, comprising instructions which, when executed by the at least one processing device, cause the at least one processing device to: receive a read request from a processor, read the data and the plurality of encoded ECC bits from the memory and, when an access control field is selected in the read request, perform an XOR operation on the plurality of encoded ECC bits and the fixed encoding pattern to generate the plurality of ECC bits.

24. The at least one machine-readable storage medium of claim 23, comprising instructions which, when executed by the at least one processing device, cause the at least one processing device to: decode the plurality of ECC bits and return the data to the processor when no error is detected in the decoded plurality of ECC bits.

25. The at least one machine-readable storage medium of claim 24, comprising instructions which, when executed by the at least one processing device, cause the at least one processing device to: when an error is detected in the decoded plurality of ECC bits, raise an exception when an ECC syndrome matches a fixed encoding pattern syndrome.

26. The at least one machine-readable storage medium of claim 24, comprising instructions which, when executed by the at least one processing device, cause the at least one processing device to: when an error is detected in the decoded plurality of ECC bits, attempt an error correction when an ECC syndrome does not match a fixed encoding pattern syndrome.

* * * * *